Figure 1:
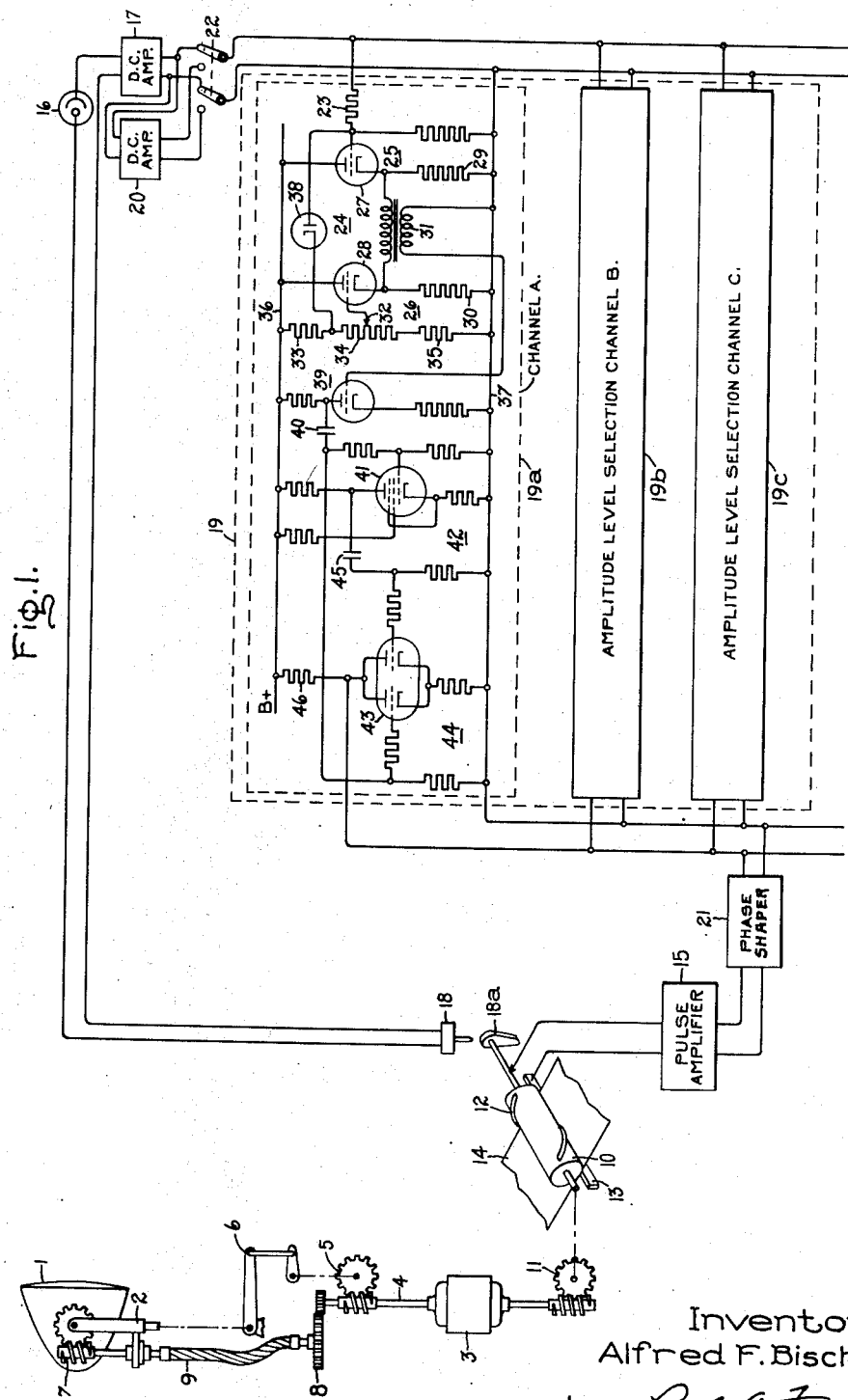

Sept. 15, 1953  A. F. BISCHOFF  2,651,963
RADIATION BEAM PATTERN RECORDER
Filed April 26, 1951  2 Sheets-Sheet 1

Inventor:
Alfred F. Bischoff,
by Paul A. Frank
His Attorney.

Sept. 15, 1953 — A. F. BISCHOFF — 2,651,963
RADIATION BEAM PATTERN RECORDER
Filed April 26, 1951 — 2 Sheets-Sheet 2

Inventor:
Alfred F. Bischoff,
by Paul A. Frank
His Attorney.

Patented Sept. 15, 1953

2,651,963

UNITED STATES PATENT OFFICE 2,651,963

RADIATION BEAM PATTERN RECORDER

Alfred F. Bischoff, Ballston Spa, N. Y., assignor to General Electric Company, a corporation of New York Application April 26, 1951, Serial No. 223,006

3 Claims. (Cl. 88—14)

This invention relates to recording devices and more particularly to recorders for plotting the beam intensity patterns of radiation devices.

In laboratory and production testing of light beam radiation devices or light sources, such as for example sealed beam automobile headlights, it is often necessary to measure the light beam pattern at a definite distance from the source. The method ordinarily followed in obtaining the desired light pattern is to set up a photoelectric cell at the point where the pattern is desired. Then the light source is tilted vertically and rotated horizontally through a number of steps so that the photoelectric cell is subjected to the intensities of various spots throughout the light beam pattern. The output of the photoelectric cell and its associated amplifier is recorded manually for each step. In order to determine the location of the various steps or spots being measured in the light pattern, a flashlight, which produces a narrow light beam, is fastened to the light under test and pointed in the opposite direction from the light. The narrow beam produced by the flashlight falls upon a calibrated grid board positioned behind the light source. By observing the location of the point of light produced on the grid board, the corresponding location of the spot in the light pattern being measured by the photoelectric cell can be determined and recorded. By repeating this process point-by-point, a flux pattern can be developed. The development of an entire flux or beam pattern is, however, obviously a laborious, time-consuming process.

Thus, great utility exists for a recorder which would automatically plot the beam pattern of the headlight. However, that is but one example of numerous applications which exist for an automatic beam pattern recorder. Another application for which such a recorder could be adapted would be in plotting the beam pattern produced by an ultra-high frequency radiation device such as a radar antenna. Still another use to which the automatic recorder could be put would be in plotting nuclear radiation patterns.

It is a general object of this invention, therefore, to provide new and improved means for plotting the beam pattern of a radiation device, and in the fulfillment thereof, it is a more specific object of this invention to provide an automatic light beam pattern recorder for plotting the flux pattern of a light source.

The beam pattern recorder of this invention employs a radiation detector device which produces electrical signals in response to actuation by a beam of radiated energy. The radiation detector device is positioned to intercept the beam of whose intensity pattern a plot is desired, and the beam producing device is mounted on a supporting device so that it is rotatable or oscillative about an axis and may also be tilted with respect to the axis. The supporting device is turned in synchronism with a drum upon which is mounted a helical conductor or helix. Fed between the helix and an electrically conducting printing bar, which together comprise a printing device, is an electro-sensitive recorder material. Pulses of electrical voltage indicative of the level of beam intensity are supplied across the printing bar and the helix by a pulse forming circuit which is actuated by the electrical signals produced by the radiation detector device.

The pulse forming circuit contains an amplitude level selection circuit comprising a plurality of parallel connected amplitude level selection channels, each of which produces a momentary signal or pulse in response to a different level of signal from the radiation detector device. By correlating the rotation of the helix with the movement of the beam producing device, each mark left on the electro-sensitive recorder material by the pulses will be indicative of the presence and position of a certain level of intensity in the beam pattern. Proper rotation and tilting of the beam producing device, so that the radiation detector device scans representative lines throughout the area of the beam, results in the marks left on the electro-sensitive recorder material by the pulses being indicative of the intensity pattern of the beam.

Alternatively a stylus-type single point printing device can be used to record the beam pattern. In such a device the stylus is moved back and forth above a moving strip of recording material in accordance with the rotary or oscillatory motion of the beam producing device, the direction of motion of the stylus being transverse to the direction of motion of the recording material. The rate of movement of the recording material is correlated with the rate at which the beam producing device is tilted. The output of the pulse forming circuit is applied to the printing device so that upon its receiving a pulse, the stylus either touches the recording material to leave a mark, or else supplies a spark which leaves a mark on the recording material. By this means a plot of the beam pattern is secured. Thus this invention is not restricted to any particular type printing device since several different types may be used to record the beam pattern.

The different types of printing devices are similar, however, in that in each mark-making means is employed selectively to make marks on a moving strip of recorder material along a line transverse to the direction of movement of the strip. The marks are made in response to electrical pulses supplied to the device from the pulse forming circuit and the mark making means and the radiation device are interconnected to cause the position of the marks to be controlled by the simultaneous positions of the radiation device.

Figure 2:
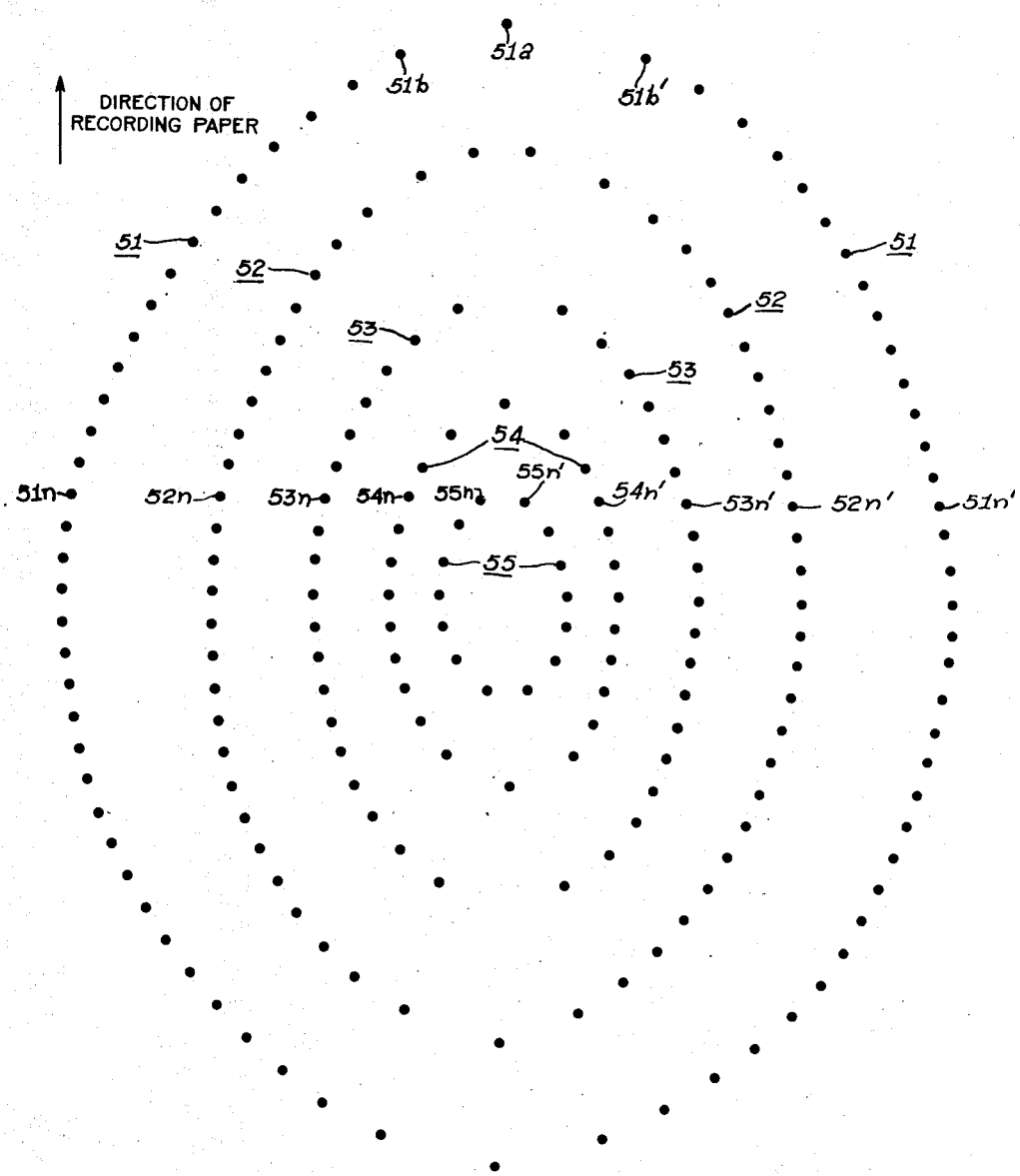

For a better and more complete understanding of this invention, together with additional objects and advantages thereof, reference should now be had to the following description and accompanying drawing in which:

Fig. 1 is a schematic diagram, partially in block form, of a light beam pattern recorder embodying this invention; and Fig. 2 is an example of the type plot produced by the beam pattern recorder of Fig. 1 for a typical light beam.

Referring to Fig. 1, in the particular embodiment of this invention illustrated therein, a light source, such as the automobile headlight 1, is mounted on a rotatable bracket 2 which is actuated to move in oscillatory motion by motor 3 through shaft 4, worm and wheel 5, and crank and arm linkage 6 in the manner well-known in the art. A worm and wheel 7 mounted on bracket 2 is likewise driven from shaft 4 but through spur gears 8 and flexible shaft 9. Worm and wheel 7 functions to tilt light 1 up or down in the vertical direction as bracket 2 oscillates back and forth in the horizontal plane.

Motor 3 also drives a recording cylinder or drum 10 through worm and wheel 11. Wound on drum 10 is a one-turn helical conductor or helix 12. A printing bar 13 is located adjacent to and parallel with the axis of drum 10, and fed between printing bar 13 and drum 10 is a sheet of electro-sensitive recorder material, such as paper 14. Printing bar 13 is connected electrically to one of the output terminals of a pulse amplifier 15 while helix 12 is connected to the other output terminal. It is by means of electrical pulses applied between printing bar 13 and helix 12 that the beam pattern of light 1 is recorded on paper 14.

The pulse producing circuit of which pulse amplifier 15 is a part is actuated by the light beam of light 1 impinging upon a light beam detection device, such as photoelectric cell 16, which produces an electrical signal in response to the illumination thereof. The signal from cell 16 is fed to an associated D. C. amplifier 17 through circuit opening and closing means such as microswitch 18. Microswitch 18 is actuated by a cam 18a which rides on the shaft of drum 10 and is a switch of the type which is alternately opened and closed by the movement of a single actuating rod or button.

From amplifier 17, the amplified signal is fed directly to an amplitude level selection circuit, designated generally by numeral 19, comprising a plurality of parallel connected amplitude level selection channels, three of which, 19a, 19b and 19c, are indicated in Fig. 1. The circuit diagram for channel A is shown in full and will be described hereinafter. Channels B and C are shown in block diagram and may be identical with channel A. Although only three channels are illustrated, many more such parallel connected channels, each adjusted to operate at a different amplitude level, will normally be employed. By means of a switch 22, the signal from amplifier 17 may be supplied to amplitude level selection circuit 19 through an additional stage 20 of D. C. amplification. Alternatively, the output of additional amplifier 20 may be connected to energize a separate amplitude level selection circuit (not shown) connected in parallel with circuit 19 and preferably identical therewith.

Amplitude level selection circuit 19 produces momentary signals or pulses in response to different levels of applied signal, as will be more fully described hereinafter. The output pulses of amplitude level selection circuit 19 are fed through a pulse shaping circuit 21 to pulse amplifier 15. Pulse shaper 21 may comprise any of the well known circuits for producing a pulse of constant amplitude and duration in response to unidirectional "trigger" pulses, and may be, for example, a cathode-coupled triggered multivibrator.

There are a number of circuits well known in the art which will produce a sudden signal or pulse at their output terminals in response to a certain level of voltage applied to their input terminals and which may, therefore, comprise the voltage amplitude level section circuit employed in my invention. A preferred circuit, however, is shown as amplitude level selection channel A in Fig. 1. The amplified signal output of amplifier 17 is fed through a channel decoupling resistor 23 to a voltage coincidence circuit 24 comprising a pair of cathode follower stages 25 and 26 including triode vacuum tubes 27 and 28 with respective cathode resistors 29 and 30. A pulse transformer 31 is connected between the cathodes of tubes 27 and 28, and tube 28 is biased by an adjustable connection 32 from its control electrode to a voltage dividing network comprising resistors 33, 34 and 35 connected between a source of high voltage 36 and a common ground connection 37. A rectifying diode 38 is preferably also connected between the control electrode of tube 27 and the connection of resistors 33 and 34 to limit the amount of positive signal voltage which may be applied to the control electrode of tube 27.

In the operation of coincidence circuit 24, with no signal the cathode of tube 28 is much more positive than that of tube 27 and a saturating current flows through pulse transformer 31 in one direction. As the signal supplied to the control electrode of tube 27 increases, a point is reached where the voltage on the cathode of tube 27 equals and passes beyond the voltage on the cathode of tube 28. At this point, the current through transformer 31 drops to zero and a voltage pulse is generated across its secondary winding. As the voltage on the cathode of tube 27 continues to rise, the transformer is saturated by a current flowing in a reverse direction than that of the no signal condition. Although the signal voltage may rise far beyond the normal operating limit of tube 27, diode 38 functions to short-circuit this excessive signal and to limit the current through tube 27 to a point just sufficient to maintain saturation in transformer 31. A decrease in signal voltage from this excessive signal condition such that the cathode voltage of tube 27 decreases through the cathode voltage of tube 28 will, of course, produce an output pulse from transformer 31 of opposite polarity.

Another coincidence circuit, not shown in the drawings, which may be employed in place of the above-described coincidence circuit 24 is the circuit described and shown as Fig. 2 in U. S. Patent 2,354,930 entitled "Electric Control Circuit" granted on August 1, 1944, to Jerry L. Stratton. In this patented circuit an output pulse is produced whenever a predetermined amplitude level is reached due to a cathode-coupled multivibrator-type regeneration whenever the cut-off voltage of an electric discharge device of the circuit is passed by an increasing or decreasing signal voltage.

The output pulses of transformer 31 are preferably amplified by a conventional vacuum tube amplifier stage 39 and are coupled by a capacitor 40 to the control electrode of a pentode tube 41 of a negative pulse inverting stage 42 and to the control electrode of one-half of a duo-triode tube 43 of amplifier 44. The output of pulse inverting stage 42 is taken from the anode of tube 41 and delivered through a coupling capacitor 45 to the control electrode of the remaining half of duo-triode tube 43. Both halves of tube 43 are connected to common anode and cathode resistors. Since pulse inverting stage 42 functions to invert only pulses of one polarity, the pulses supplied to both halves of duo-triode tube 43 are of the same effective polarity regardless of the polarity of the output of transformer 31. Consequently, composite unidirectional pulses are derived from the voltage developed across the common anode resistor 46 and are connected, as indicated, to energize the pulse shaping circuit 21.

In operation of the recorder, motor 3 drives light 1 and drum 10 as hereinbefore mentioned. The degree of the oscillation of light 1 can be varied by changing the size of crank and arm mechanism 6. The gearing of worm and wheel 5 is twice that of worm and wheel 11 so that drum 10 makes one complete revolution for each half-oscillation or sweep of the light. In other words, for the left to right sweep of light 1, drum 10 makes one complete revolution, while for the right to left sweep of light 1 it makes another complete revolution. The angular sweep of light 1 must be at least as wide as the angle subtended by its beam. For example, assume that the beam pattern of light 1 subtends a horizontal angle of approximately 15°. Then for a complete plot to be made, the light must oscillate in the horizontal plane at least 7½° on either side of the straight line between the center position of light 1 and photoelectric cell 16. The position of drum 10 is synchronized with that of light 1 so that when light 1 is at either end of its sweep, the extremities of helix 12 are directly above printing bar 13.

The pulse forming circuit is actuated by photoelectric cell 16 for either the left or right sweeps of light 1 or for the right to left sweeps of light 1, but not for both since cam 18a alternately opens and closes microswitch 18 for each revolution of drum 10 and thus for each half-oscillation of light 1.

As light 1 oscillates back and forth in a horizontal direction, it is slowly tilted in the vertical direction by worm and wheel 7. Thus each circuit actuating sweep of light 1 causes photoelectric cell 16 to scan a different line across the beam pattern. The number of sweeps necessary to plot the pattern depends upon the definition required and the height of the beam, i. e. the vertical angle subtended by the beam. If it is assumed that light 1 is continually tilted upward by worm and wheel 7, then it would be initially mounted on bracket 2 so that on its first horizontal sweep only the extreme upper portion of the beam pattern would strike cell 16. If light 1 is, however, tilted downward by worm and gear wheel 7, the light would be mounted so that on its first horizontal sweep the extreme lower portion of the beam would strike cell 16. The feeding of paper 14 between helix 12 and printing bar 13 must be correlated with the speed of light 1 to insure a fresh surface of the paper lying between helix 12 and printing bar 13 for each horizontal recording sweep of light 1. Paper 14 may be fed by any of the means well known in the art.

Each horizontal sweep of light 1 causes the amount of light impinging on photoelectric cell 16 to increase from a minimum to a maximum and then back to a minimum again. The maximum light intensity falling on cell 16 will vary appreciably for different sweeps as light 1 is tilted. Assuming the response of photoelectric cell 16 and the associated amplifier 17 to be linear, the voltage impressed on amplitude level selection circuit 19 will vary directly from minimum to maximum to minimum in accordance with the light falling on cell 16. Each of amplitude level selection channels of circuit 19 is calibrated, such as by adjustment of connection 32 on resistor 34, to produce a momentary signal or pulse upon a different level or amplitude of the applied voltage.

The number of amplitude level selection channels used is determined by the number of light level indicating or contour lines desired in the plot of the beam pattern. For a plot containing five contour lines, as is illustrated in Fig. 2, five amplitude level selection channels, each responsive to a different level of applied voltage, would be needed. If a plot showing the less intense outer edges of the beam pattern is desired, switch 22 is thrown to include the additional stage 20 of signal amplification. Alternatively, an additional amplitude level selection circuit may be connected in parallel with circuit 19 and energized by the output of amplifier 20. Amplitude level selection circuits of essentially the same design can thus be used for the whole possible range of applied signals. This feature makes it possible to record light contours differing in light intensity by more than two hundred to one and still maintain a high degree of measurement accuracy.

The output pulses from circuit 19 are fed through pulse shaping circuit 21 to pulse amplifier 15, and the output pulses of pulse amplifier 15 are applied between helix 12 and printing bar 13 to produce visible marks on paper 14. Pulse shaping circuit receives pulses of varying size and width from the different channels of circuit 19 and, in a manner well known in the art, shapes them and feeds them as pulses of substantially constant amplitude duration to the common pulse amplifier 15. If desired, the output of one or more of the channels of circuit 19 may be supplied to a separate pulse shaping circuit connected in parallel with circuit 21. The amplitude and/or duration of the pulses produced by these separate pulse shaping circuits may be slightly different than those produced by circuit 21 with the result that the contour lines associated with the channels supplying such separate pulse shaping circuits are printed with a distinctive mark on paper 14 to make them readily distinguishable. By reference to such distinctive contour lines, the other contours in the final plot are more easily identified than would otherwise be possible.

In operation, the voltage output of cell 16 and its associated amplifier 17 rises from a minimum to a maximum and then decays again to a minimum as the light beam sweeps across cell 16. As the voltage rises, first the one of the channels of circuit 19 responsive to the least applied voltage produces a pulse, then the one responsive to the next to smallest applied voltage produces a pulse, and so forth until the voltage reaches its maximum value. The number of channels actuated, of course, depends upon the maximum value reached by the voltage and for any beam, the maximum value reached by the voltage in turn depends upon the portion of the beam being scanned. Thus for a sweep across the extreme outer portion of the beam, none of the channels of circuit 19 may be actuated, while for a sweep across the center portion of the beam, all the channels of the circuit 19 may be actuated. The same number of pulses produced during the rise of the applied voltage will ordinarily again be produced during the decay of the applied voltage. During the decay, however, circuit 19 will produce pulses in the opposite order from that which occurred during the rise. The channel last to produce a pulse during the rise in applied voltage will be the first to produce during the decay in applied voltage, and the first to produce during the rise will be the last to produce during the decay. This is, of course, due to the fact that the voltage levels to which the channels of circuit 19 are responsive occur in the reverse order during the decay of the voltage.

Since the movement of helix 12 down printing bar 13 is synchronized with the sweep of light 1, the position of any mark caused by any one of the channels of circuit 19 indicates the presence and position of its associated level of light intensity in the horizontal line of the beam pattern scanned during the particular sweep in which the mark was made. If a number of horizontal sweeps are made, and the light beam tilted to a different vertical angle for each, the marks caused by any one channel form a contour line which is indicative of the line along which its associated level of light lies in the beam pattern. These light level indicating or contour lines, when considered one within another, give a plot of the light intensity pattern of the light beam produced by light 1.

Fig. 2 illustrates a typical plot containing five contour lines produced by a system having five amplitude level selection channels. The contour lines resulting from the responses of the five channels are numbered 51, 52, 53, 54 and 55, in order of increasing level of light intensity necessary to produce pulses from the channels. The plot is started with the light 1 tipped vertically to an extent such that only the extreme upper or lower portion of its beam will strike the cell 16 as the light sweeps horizontally. When the light is, for example, at the left-hand limit of its horizontal travel, the ends of helix 12 are at the edges of the paper and cam 18a actuates switch 18 and closes it. Switch 18 remains closed while the beam of light travels across the cell 16, the drum 10 rotates, and the helix travels across the paper. As the light beam moves horizontally across the cell 16, the output of the D. C. amplifier rises until a maximum is reached at the center of the sweep. In Fig. 2 this maximum voltage has reached the level necessary to cause a pulse to be produced by that channel which has been preset to respond to the D. C. voltage produced by the least light intensity that it is desired to plot. This pulse, when shaped and amplified produces a mark 51a on the paper, the first mark produced in the plot.

As previously mentioned, each channel will produce a pulse each time its response level is passed by the D. C. voltage output of the cell and amplifier, regardless of whether the applied voltage is rising or falling. However, during the first horizontal sweep, which produced the first mark 51a, the D. C. level did not exceed the response level of the selection channel, but merely reached the necessary level and then fell again. Thus, only one pulse and one mark were produced.

As the beam continues to move horizontally and the beam intensity decreases, the voltage output of the cell amplifier continues to decrease. When the beam reaches the limit of its travel in this direction, the drum has made one complete revolution, and the helix is in position to start across the paper again. At this time, the cam 18a again actuates switch 18, but now the movement opens the switch. Thus, as the beam of light swings back to the left side, from which it started, and the drum 10 rotates in synchronism therewith, no D. C. voltage is produced by the amplifier and, of course, no marks are produced on the paper record. After the beam has swung back, the switch is again closed by the cam and the circuits are ready to produce marks when the proper levels of voltage are applied.

By the time the second sweep starts the vertical tilt of the light has been altered slightly by the worm and wheel 7, and the paper has been advanced between the drum 10 and printing bar 13. As the beam starts its second left-to-right sweep and the drum and helix moves in synchronism with it, the intensity of light falling on the cell and the D. C. output of the amplifier again rise. The cell is now intercepting the beam nearer the center of the beam than during the first sweep, and so the intensity of the beam is somewhat greater. Therefore, the voltage level necessary to actuate the lowest level channel of circuit 19 is reached sooner than during the first sweep, and a mark 51b is produced nearer the edge of the paper than mark 51a. The intensity of the light and the output of the D. C. amplifier continue to rise after the mark 51b is produced, but the voltage does not become great enough to actuate the next higher level selection channel before the center of the sweep (and maximum intensity) is reached. As the intensity falls off beyond the center of the beam, the D. C. voltage falls from a higher value to the level for which the selector channel is set and another mark 51b' is produced. The beam continues its movement until the right-hand extreme is reached, at which time the switch 18 opens and the beam returns to the left side.

As the horizontal traces pass closer to the center of the beam on successive sweeps, more of the amplitude selection channels are actuated and more marks produced during each sweep. On those traces near the center of the beam the intensity is sufficient to cause all five of the channels to produce pulses. Marks labeled 51n, 52n, 53n, 54n, 55n, 55n', 54n', 53n', 52n', and 51n', are produced in order as the helix moves from left to right across the paper. The first five marks are produced as the light intensity increases and the D. C. output rises through the various levels to which the five channels are responsive. The last five marks are produced as the intensity decreases and the D. C. output falls off and again passes through the various response levels. It is apparent that the channel which is preset to have the highest response level will be the last actuated by the rising voltage and the first actuated by the falling voltage. Therefore, its marks form the inner contour, which is surrounded by contours representing decreasing light intensities as they are located farther from the center.

Below the center of the beam, the intensity of the light falling on the cell during each horizontal sweep starts to decrease, and the plot is completed when a sweep is made which results in only one mark or no mark being made.

As mentioned previously, this invention is not restricted to plotting the pattern of light beams. It may be used for any type of radiation beams for which detecting means exist. It would be especially useful in ultra-high frequency work. For example, to plot the beam pattern of a radar antenna, the only change necessary in the illustrated circuit would be substitute an antenna and an ultra-high frequency detecting means, such as an electron discharge device, for example a diode detector, for the photoelectric cell. Likewise, nuclear radiation patterns could be recorded if a suitable detector were substituted for photoelectric cell 16. Therefore, while the present invention has been described by reference to a particular embodiment thereof, it will be understood that numerous modifications may be made by those skilled in the art without actually departing from the invention and it is aimed in the appended claims to cover all such equivalent variations as come within the true spirit and scope of the foregoing disclosure.

What I claim as new and desire to secure by Letters Patent of the United States is:

1. In a device for plotting the beam intensity pattern of a light source, a combination comprising a rotatable helical conductor; an electrically conducting printing bar positioned adjacent said helical conductor; means for feeding a sheet of electro-sensitive material intermediate said helical conductor and said printing bar; means for rotating said light source and means for tilting said light source with respect to the axis of rotation thereof; said helical conductor being connected to said light source rotating means for rotation together with said radiation device; a light beam detection device for producing an electrical signal in response to the illumination thereof positioned to intercept the light beam produced by said light source; a pulse forming circuit comprising an amplitude level selection circuit including a plurality of parallel connected amplitude level selection channels for producing electrical pulses in response to different levels of applied signal, each of said amplitude level selection channels being responsive to a different level of applied signal, said pulse forming circuit connected to be actuated by said radiation detector device; and means including connections for applying the output of said pulse forming circuit between said helical conductor and said printing bar, whereby to produce marks on a sheet of electrosensitive material when said material is positioned intermediate said helical conductor and said printing bar, each of said marks being indicative of the presence and position of a certain level of intensity in said light beam.

2. In a device for plotting the beam intensity pattern of a light source, a combination comprising a rotatable helical conductor; an electrically conducting printing bar positioned adjacent said helical conductor; means for feeding a sheet of electro-sensitive material intermediate said helical conductor and said printing bar; means for rotating said light source and means for tilting said light source with respect to the axis of rotation thereof; means correlating the movement of said helical conductor with the movement of said light source; a light beam detection device for producing an electrical signal in response to the illumination thereof positioned to intercept the beam produced by said light source; means including connections for amplifying the output signal of said light beam detection device; a pulse forming circuit for producing electrical pulses in response to different levels of applied signals including in series relationship an amplitude level selection circuit, a pulse shaping circuit and an amplifying circuit, said amplitude level selection circuit having a plurality of amplitude level selection channels responsive to different levels of applied signals, said pulse forming circuit connected to be actuated by the amplified output signal from said light beam detecting device; and means including connections for applying the output of said pulse forming circuit between said helical conductor and said printing bar, whereby to produce marks on a sheet of electrosensitive material when said material is positioned intermediate said helical conductor and said printing bar, each of said marks being indicative of the presence and position of a certain level of intensity in said light beam.

3. A device for plotting the beam intensity pattern of a radiation device comprising, a radiation detector for providing an electric signal in response to incident radiated energy, means for sweeping a beam of energy radiated from said device across said radiation detector, a recording device including a rotatable helical conductor and a printing bar adjacent said conductor parallel to the axis of rotation thereof, means for correlating the instantaneous rotational position of said helical conductor to the instantaneous angular position of said radiated beam relative to the position of said detector, a plurality of parallel-connected amplitude level selection channels connected to receive the electric signal from said radiation detector, each of said amplitude level selection channels providing an output electric pulse in response to a different amplitude level of the received electric signal, and means including connections for supplying the electric pulses produced by each amplitude level selection channel between said helical conductor and said printing bar, whereby to produce marks on an electrosensitive material when said material is interposed between said helical conductor and said printing bar, each of said marks being indicative of the presence and position of a certain level of intensity in said beam of radiated energy.

ALFRED F. BISCHOFF.

References Cited in the file of this patent

UNITED STATES PATENTS

| Number | Name | Date |
|---|---|---|
| 2,500,746 | Ellenberger | Mar. 14, 1950 |
| 2,516,389 | Hurvitz | July 25, 1950 |
| 2,534,820 | Hurvitz | Dec. 19, 1950 |

FOREIGN PATENTS

| Number | Country | Date |
|---|---|---|
| 595,313 | Great Britain | Dec. 2, 1947 |